US010713866B2

(12) United States Patent
Ishikawa et al.

(10) Patent No.: US 10,713,866 B2
(45) Date of Patent: Jul. 14, 2020

(54) VEHICLE OPERATION DATA COLLECTION APPARATUS, VEHICLE OPERATION DATA COLLECTION SYSTEM, AND VEHICLE OPERATION DATA COLLECTION METHOD

(71) Applicant: Hitachi, Ltd., Chiyoda-ku, Tokyo (JP)

(72) Inventors: Masayoshi Ishikawa, Tokyo (JP); Mariko Okude, Tokyo (JP); Takehisa Nishida, Tokyo (JP); Kazuo Muto, Tokyo (JP); Atsushi Katou, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 275 days.

(21) Appl. No.: 15/794,062

(22) Filed: Oct. 26, 2017

(65) Prior Publication Data

US 2018/0130271 A1 May 10, 2018

(30) Foreign Application Priority Data

Nov. 4, 2016 (JP) ................................ 2016-216529

(51) Int. Cl.

| | |
|---|---|
| ***G01M 17/00*** | (2006.01) |
| ***G06F 7/00*** | (2006.01) |
| ***G06F 11/30*** | (2006.01) |
| ***G07C 5/00*** | (2006.01) |
| ***G07C 5/08*** | (2006.01) |
| *G21C 17/00* | (2006.01) |

(52) U.S. Cl.

CPC ............. *G07C 5/085* (2013.01); *G07C 5/008* (2013.01); *G07C 5/0816* (2013.01); *G07C 5/0841* (2013.01)

(58) Field of Classification Search

CPC ...... G07C 5/085; G07C 5/008; G07C 5/0816; G07C 5/0841; G07C 5/006; G07C 5/0808; G06F 11/30

USPC ................................ 701/29.3, 31.9; 702/182

See application file for complete search history.

(56) References Cited

U.S. PATENT DOCUMENTS

2003/0216889 A1* 11/2003 Marko .................. G07C 5/008 702/182
2012/0277949 A1 11/2012 Ghimire et al.
2016/0180610 A1* 6/2016 Ganguli .............. G07C 5/0808 701/31.9

FOREIGN PATENT DOCUMENTS

EP 3 038 048 A1 6/2016
JP 4107238 B2 6/2008

OTHER PUBLICATIONS

European Search Report issued in counterpart European Application No. 17198545.0 dated Mar. 29, 2018 (thirteen (13) pages).

* cited by examiner

*Primary Examiner* — Mahmoud S Ismail
(74) *Attorney, Agent, or Firm* — Crowell & Moring LLP

(57) ABSTRACT

A vehicle operation data collection apparatus includes a vehicle operation history DB which accumulates vehicle operation data acquired from a vehicle; and a processor programmed to evaluate excess or deficiency of vehicle operation data accumulated in the vehicle operation history DB for each of abnormality types, on the basis of accuracy information of classification obtained when classifying the abnormality types occurring in the vehicle by machine learning, using vehicle operation data accumulated in the vehicle operation history DB, extract a vehicle suitable for acquiring data of an abnormality type evaluated as data deficiency from a vehicle maintenance history DB as a collection target vehicle, and distribute a collection command instructing collection of operation data to the extracted collection target vehicle.

3 Claims, 6 Drawing Sheets

FIG. 2A

| DATA ID | ACQUISITION DATA AND TIME | ACQUISITION POSITION | VEHICLE ID | VEHICLE TYPE | COMPONENT CONFIGURATION | SENSOR ITEM | SAMPLING FREQUENCY | OPERATION DATA | ABNORMALITY TYPE |
|---|---|---|---|---|---|---|---|---|---|
| 001 | 2016/1/1 08:40:50 | POINT 1 | VEHICLE 1 | VEHICLE TYPE A | ENGINE | SENSOR 1, 2, 3 | 1Hz | DATA 1 | NORMAL |
| 002 | 2016/1/2 02:02:02 | POINT 2 | VEHICLE 2 | VEHICLE TYPE B | BRAKING DEVICE | SENSOR 1, 3 | 2Hz | DATA 2 | ABNORMAL A |
| ... | ... | ... | ... | ... | ... | ... | ... | ... | ... |

FIG. 2B

| DATA ACQUISITION TIME | ACCELERATOR OPENING DEGREE | ROTATIONAL NUMBER OF ENGINE | ... |
|---|---|---|---|
| 08:40:41 | 10 | 4000 rpm | ... |
| 08:40:42 | 15 | 5000 rpm | ... |
| 08:40:43 | 20 | 6000 rpm | ... |
| ... | ... | ... | ... |

FIG. 3

| MAINTENANCE DATA AND TIME | MAINTENANCE BASE | MAINTENANCE STAFF | VEHICLE ID | CUMULATIVE MAINTENANCE COST | MAINTENANCE COMPONENT | MAINTENANCE CONTENT | MAINTENANCE COST |
|---|---|---|---|---|---|---|---|
| 2016/1/15 15:15 | BASE 1 | MAINTENANCE STAFF 1 | VEHICLE 2 | ¥100,000 | COMPONENT 2 | MAINTENANCE 1 | ¥5,000 |
| 2016/1/15 16:30 | BASE 2 | MAINTENANCE STAFF 2 | VEHICLE 3 | ¥70,000 | COMPONENT 3 | MAINTENANCE 2 | ¥10,000 |
| ... | ... | ... | ... | ... | ... | ... | ... |

FIG. 5A

| VEHICLE TYPE, COMPONENT | PROCESS | SENSOR ITEM | SAMPLING FREQUENCY | DATA NUMBER | CORRECT ANSWER RATE: NORMALITY | CORRECT ANSWER RATE: ABNORMALITY |
|---|---|---|---|---|---|---|
| VEHICLE TYPE A, COMPONENT 1 | ABNORMALITY DETECTION | SENSOR 1, 2, 3 | 1Hz | 1050 | 950/1000 | 25/50 |
| VEHICLE TYPE A, COMPONENT 1 | ABNORMALITY DETECTION | SENSOR 1, 3 | 2Hz | 720 | 600/700 | 10/20 |
| ... | ... | ... | ... | ... | ... | ... |

FIG. 5B

| VEHICLE TYPE, COMPONENT CONFIGURATION | PROCESS | SENSOR ITEM | SAMPLING FREQUENCY | DATA NUMBER | CORRECT ANSWER RATE: ABNORMALITY A | CORRECT ANSWER RATE: ABNORMALITY B | CORRECT ANSWER RATE: ABNORMALITY C |
|---|---|---|---|---|---|---|---|
| VEHICLE TYPE A, COMPONENT 1 | ABNORMALITY CLASSIFICATION | SENSOR 1, 2, 3 | 1Hz | 29 | 2/3 | 0/1 | 23/25 |
| VEHICLE TYPE A, COMPONENT 1 | ABNORMALITY CLASSIFICATION | SENSOR 1, 3 | 2Hz | 20 | 2/2 | 0/0 | 15/18 |
| ... | ... | ... | ... | ... | ... | ... | ... |

FIG. 6

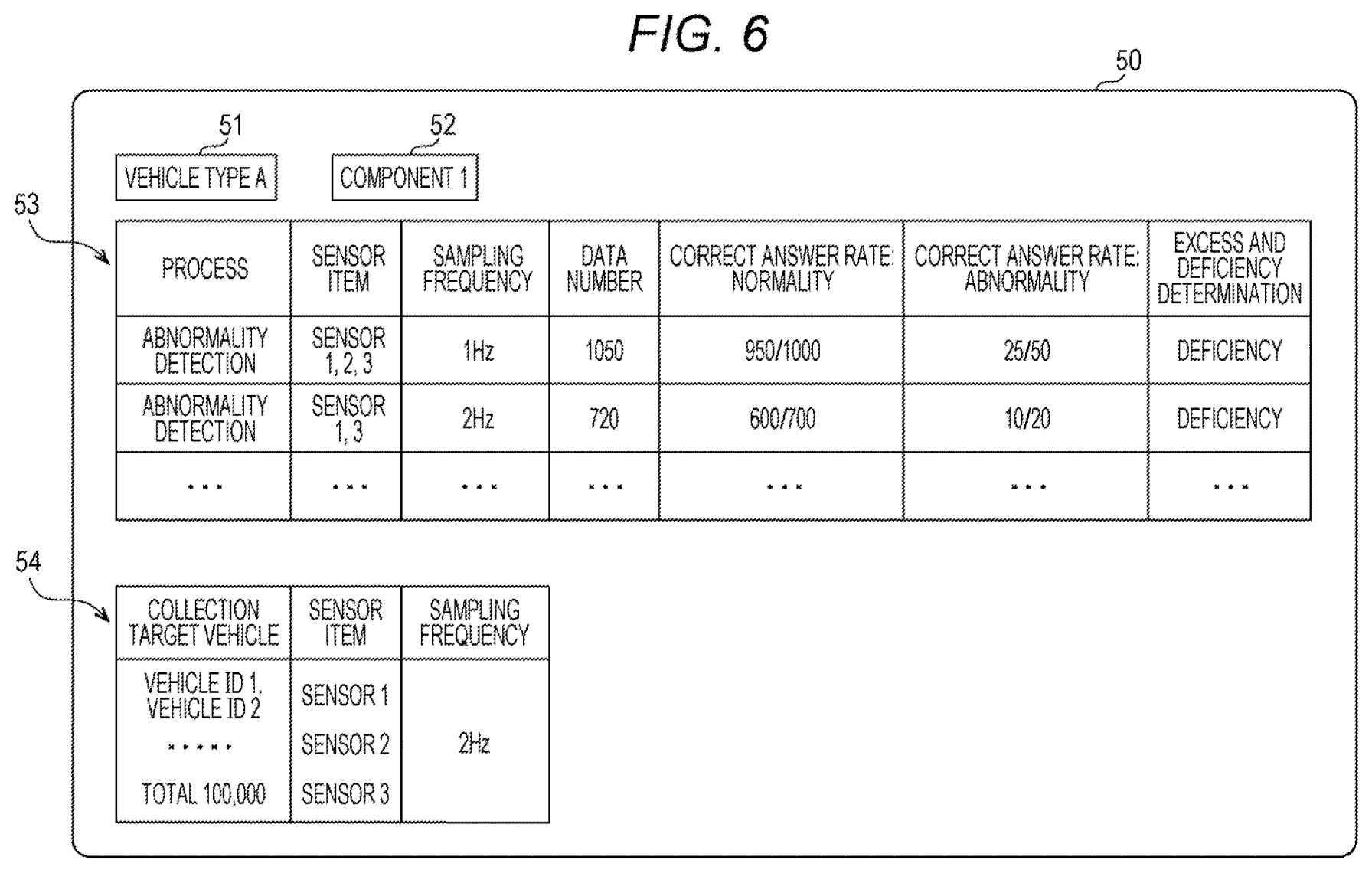

50

51 VEHICLE TYPE A

52 COMPONENT 1

53

| PROCESS | SENSOR ITEM | SAMPLING FREQUENCY | DATA NUMBER | CORRECT ANSWER RATE: NORMALITY | CORRECT ANSWER RATE: ABNORMALITY | EXCESS AND DEFICIENCY DETERMINATION |
|---|---|---|---|---|---|---|
| ABNORMALITY DETECTION | SENSOR 1, 2, 3 | 1Hz | 1050 | 950/1000 | 25/50 | DEFICIENCY |
| ABNORMALITY DETECTION | SENSOR 1, 3 | 2Hz | 720 | 600/700 | 10/20 | DEFICIENCY |
| ··· | ··· | ··· | ··· | ··· | ··· | ··· |

54

| COLLECTION TARGET VEHICLE | SENSOR ITEM | SAMPLING FREQUENCY |
|---|---|---|
| VEHICLE ID 1, VEHICLE ID 2 ······ TOTAL 100,000 | SENSOR 1 SENSOR 2 SENSOR 3 | 2Hz |

VEHICLE OPERATION DATA COLLECTION APPARATUS, VEHICLE OPERATION DATA COLLECTION SYSTEM, AND VEHICLE OPERATION DATA COLLECTION METHOD

CROSS REFERENCE TO RELATED APPLICATIONS

This application claims priority under 35 U.S.C. § 119 to Japanese Patent Application No. 2016-216529, filed Nov. 4, 2016, the disclosures of which are expressly incorporated by reference herein.

BACKGROUND OF THE INVENTION

1. Field of the Invention

The present invention relates to a vehicle operation data collection system, a vehicle operation data collection apparatus, and a vehicle operation data collection method for collecting operation data of a vehicle suitable for detecting vehicle abnormality.

2. Description of the Related Art

In general, various kinds of sensors for monitoring an operation state of components are provided in main components (for example, an engine, wheels, or the like) which constitute a vehicle. Therefore, by monitoring the output values of the sensors, it is possible to detect malfunction or abnormality (hereinafter collectively referred to as vehicle abnormality) of the components. A statistical method is often used to detect such a vehicle abnormality. For example, when the output value of a specific sensor under a specific operation and environmental condition of a certain vehicle is greatly different from an average value of the output values of the same sensors under the same operation and environmental condition of another vehicle of the same vehicle type, it is considered that there is some abnormality in the "certain vehicle" mentioned above.

Generally, in order to detect vehicle abnormality by the statistical method, it is necessary to collect output values (sensor data) of as many sensors as possible from as many vehicles as possible to a data center or the like over a considerable period of time. However, it is practically difficult to collect sensor data of all sensors in the vehicle from vehicles of any type, for example, traveling on the road to the data center, from the viewpoint of communication load, analysis load, and accumulation load. Therefore, when detecting vehicle abnormality by the statistical method, it is important to select and efficiently collect sensor data contributing to statistical process of abnormality detection as much as possible. In this specification, sensor data obtained from at least one sensor mounted in a running vehicle is referred to as vehicle operation data.

JP-4107238-B2 discloses an example of an information center which receives information such as vehicle type, components, and point and instructs transmission of similar diagnostic information to components of vehicle of the same type running on the same point, in addition to abnormal diagnostic information (operation data) from a vehicle in which an abnormality is detected. In this example, the information center can analyze the cause of occurrence of the abnormality on the basis of the diagnostic information obtained from a plurality of vehicles under the same running environment. Therefore, analysis of the cause of occurrence of abnormality is facilitated.

SUMMARY OF THE INVENTION

In order to detect the vehicle abnormality by the statistical method, it is necessary to collect the number of operation data sufficient for distinguishing between abnormality and normality in advance for each type of various abnormalities occurring in the vehicle. In general, it is relatively easy to collect a sufficient number of operation data for normal operation data or abnormal operation data with high occurrence frequency. In contrast, it is not always easy to collect abnormal operation data with low occurrence frequency.

The information center disclosed in JP-4107238-B2 can efficiently collect operation data for analyzing the cause of occurrence of an abnormality detected in a certain vehicle from another vehicle. However, this does not mean that a large number of abnormal operation data required when trying to determine the normality/abnormality of the operation data using a statistical method, in particular, machine learning is obtained. Even if there are many normal operation data, when the abnormal operation data is small, it is not possible to improve the accuracy of determination of normality/abnormality.

An object of the present invention is to provide a vehicle operation data collection apparatus, a vehicle operation data collection system, and a vehicle operation data collection method capable of efficiently collecting abnormal operation data in a vehicle.

A vehicle operation data collection apparatus according to the present invention includes: a vehicle operation data accumulation unit which accumulates operation data of a vehicle acquired from the vehicle; a data excess and deficiency evaluation unit which evaluates excess or deficiency of operation data of the vehicle accumulated in the vehicle operation data accumulation unit for each of abnormality types, on the basis of accuracy information of classification obtained when classifying the abnormality types occurring in the vehicle by machine learning, using operation data of the vehicle accumulated in the vehicle operation data accumulation unit; a collection target vehicle extraction unit which extracts a vehicle suitable for acquiring data of an abnormality type evaluated as data deficiency by the data excess and deficiency evaluation unit from a database accumulating maintenance history information of the vehicle as a collection target vehicle; and a collection command distribution unit which distributes a collection command instructing collection of operation data to the extracted collection target vehicle.

According to the present invention, there are provided a vehicle operation data collection apparatus, a vehicle operation data collection system, and a vehicle operation data collection method capable of efficiently collecting abnormal operation data in a vehicle.

BRIEF DESCRIPTION OF THE DRAWINGS

FIG. 2A is a diagram illustrating an example of a configuration of vehicle operation history data accumulated in a vehicle operation history DB, and FIG. 2B is a diagram illustrating an example of a configuration of operation data included in the vehicle operation history data;

FIG. 3 is a diagram illustrating an example of a configuration of vehicle maintenance history data accumulated in a vehicle maintenance history DB;

FIGS. 5A and 5B are diagrams illustrating an example of a learning result obtained by a classification learning section in a table format, FIG. 5A illustrates an example of a learning result in the case of abnormality detection, and FIG. 5B illustrates learning result in the case of abnormality classification; and FIG. 6 is a diagram illustrating an example of an operation data collection condition display screen displayed on an evaluator terminal by a collection condition display section.

DESCRIPTION OF THE PREFERRED EMBODIMENTS

Figure 1:
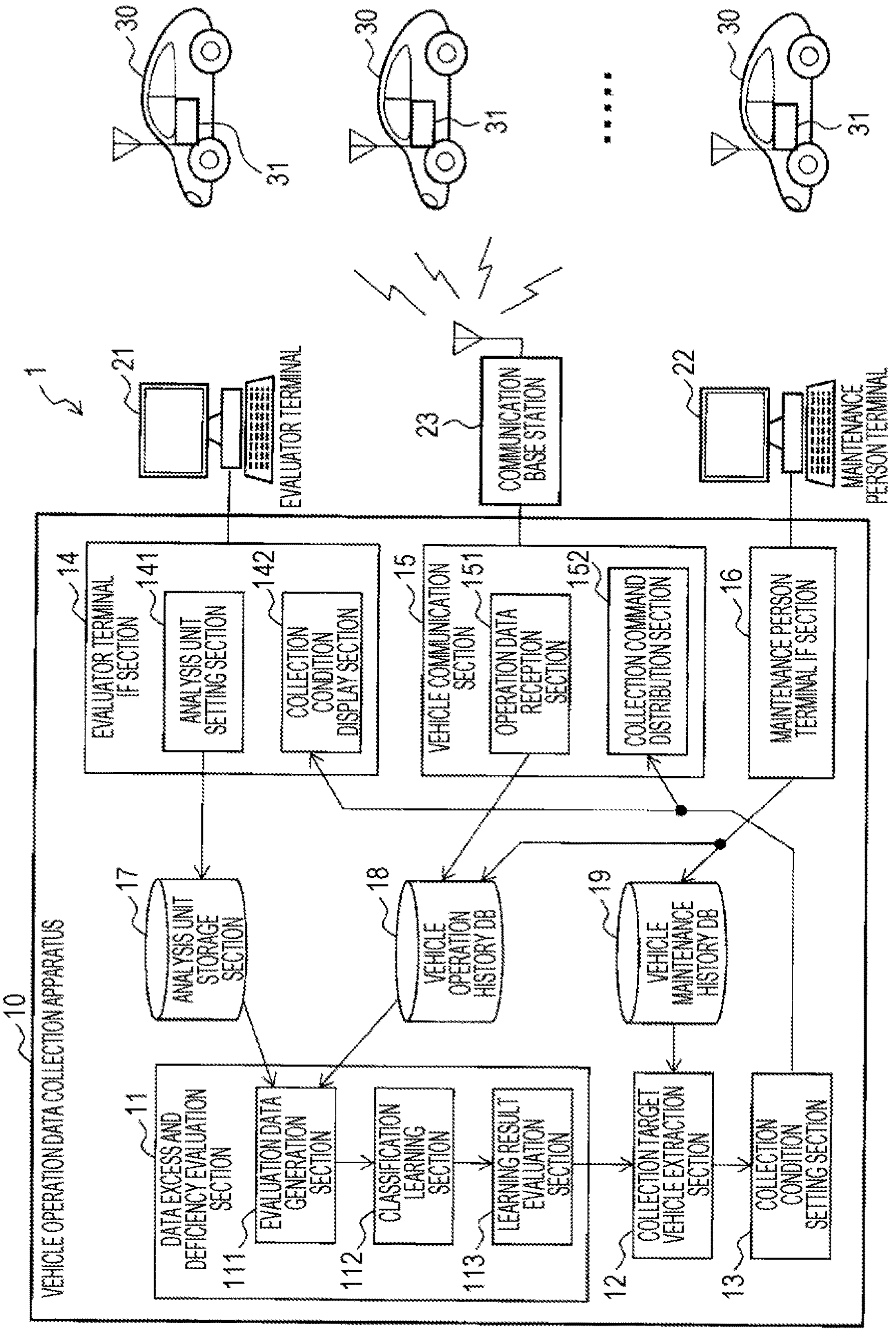
FIG. 1 is a diagram illustrating an example of a configuration of a vehicle operation data collection system including a vehicle operation data collection apparatus according to an embodiment of the present invention.

Hereinafter, embodiments of the present invention will be described in detail with reference to the drawings. In each drawing, the common constituent elements are denoted by the same reference numerals, and repeated descriptions will not be provided.

FIG. 1 is a diagram illustrating an example of a configuration of a vehicle operation data collection system 1 including a vehicle operation data collection apparatus 10 according to an embodiment of the present invention. As illustrated in FIG. 1, the vehicle operation data collection system 1 is configured to include the vehicle operation data collection apparatus 10, and an in-vehicle terminal device 31 mounted on each of the plurality of vehicles 30 and connected to the vehicle operation data collection apparatus 10 to be wirelessly communicable via a communication base station 23. The vehicle operation data collection apparatus 10 is connected to an evaluator terminal 21 used by an evaluator who evaluates or analyzes abnormal operation data generated in the vehicle 30, and a maintenance person terminal 22 used by a maintenance person of the vehicle 30, via a dedicated communication line or a general purpose communication network.

Here, various kinds of sensors for monitoring the operation state are attached to the main components such as an engine constituting the vehicle 30. Further, the vehicle 30 itself is provided with a thermometer, a camera, a global positioning system (GPS) position sensor, and the like for detecting the state of the outside world. Further, when receiving the operation data collection command transmitted from the vehicle operation data collection apparatus 10, the in-vehicle terminal device 31 collects the sensor data of the sensor instructed by the operation data collection command. Further, the collected sensor data is transmitted to the vehicle operation data collection apparatus 10 as the operation data of the vehicle 30.

The vehicle operation data collection apparatus 10 includes blocks relating to the processing function, such as data excess and deficiency evaluation section 11, a collection target vehicle extraction section 12, a collection condition setting section 13, an evaluator terminal IF section 14, a vehicle communication section 15, and a maintenance person terminal IF section 16. Further, the vehicle operation data collection apparatus 10 includes blocks relating to storage functions, such as an analysis unit storage section 17, a vehicle operation history DB 18, and a vehicle maintenance history DB 19.

Here, the data excess and deficiency evaluation section 11 includes an evaluation data generation section 111, a classification learning section 112, a learning result evaluation section 113, and the like as sub-blocks. Similarly, the evaluator terminal IF section 14 includes an analysis unit setting section 141, a collection condition display section 142, and the like as sub-blocks, and the vehicle communication section 15 includes an operation data reception unit 151, a collection command distribution section 152 and the like as sub-blocks.

The vehicle operation data collection apparatus 10 having the above configuration is achieved by a single computer or a plurality of computers coupled to each other via a dedicated communication line or a general purpose communication network. In that case, the function of the block related to the processing function of the vehicle operation data collection apparatus 10 is embodied by the computer processing apparatus which executes a predetermined program stored in the storage device of the computer. Further, the block relating to the storage function is embodied as a storage region on the storage device of the computer.

Subsequently, details of each block constituting the vehicle operation data collection apparatus 10 will be sequentially described with reference to the drawings of FIGS. 2A and 2B and the following drawings in addition to FIG. 1.

The collection command distribution section 152 of the vehicle communication section 15 specifies the vehicle 30 and then distributes the operation data collection command which instructs the in-vehicle terminal device 31 mounted on the vehicle 30 to acquire the sensor data of the sensor included in the vehicle 30. Thus, for example, an operation data collection command such as "acquiring an opening degree sensor of an accelerator and sensor data of an engine tachometer at a sampling frequency of 1 Hz" is distributed to the in-vehicle terminal device 31 of the specific vehicle 30.

The operation data reception unit 151 receives the operation data of the vehicle 30 transmitted from the in-vehicle terminal device 31 of the vehicle 30 in response to the distributed operation data collection command, and stores the received operation data as vehicle operation history data in the vehicle operation history DB (database) 18.

FIG. 2A is a diagram illustrating an example of the configuration of the vehicle operation history data stored in the vehicle operation history DB 18, and FIG. 2B illustrates an example of the configuration of the operation data included in the vehicle operation history data. As illustrated in FIG. 2A, the vehicle operation history data includes data of items such as "data ID", "acquisition date/time", "acquisition position", "vehicle ID", "vehicle type", "component configuration", "sensor item", "sampling frequency", "operation data", and "abnormality type".

Here, in the column of "data ID", identification information added for uniquely identifying the vehicle operation history data of the row in the vehicle operation history DB 18 is stored. Further, in the columns of "acquisition date and time" and "acquisition position", information of the date and time when the "operation data" of the relevant row was acquired, and the position information are stored. Further, the "acquisition position" may be information represented by the address name of the point or information represented by the latitude and longitude acquired by a GPS position sensor or the like.

In the column of "vehicle ID", identification information for uniquely identifying the vehicle 30 from which "operation data" of the relevant row is acquired is stored, and in the column of "vehicle type", a model name or a type name of the vehicle 30 is stored. In the present embodiment, it is assumed that a unique vehicle ID is affixed in advance to all the vehicles 30 that are targets of the vehicle operation data collection system 1.

In the column of "component configuration", information on the component configuration of the vehicle 30 from which "operation data" of the relevant row is acquired is stored. For example, in the column of "component configuration", the type of each component such as an engine or a braking device, the type of an injector attached to the engine, the type of each part attached to the component, and the like are stored.

In the column of "sensor item", the sensor name of the sensor that detects the "operation data" of the relevant row or the name of the output signal from the sensor, for example, information such as "accelerator opening degree" or "rotational speed of the engine" is stored. Further, in the column of "sampling frequency", the sampling frequency when "operation data" of the relevant row is detected, for example, information such as "1 Hz" or "2 Hz" is stored.

In the column of "operation data", sensor data detected by a sensor specified by "sensor item" of the relevant row is stored. Since the "operation data" normally has a data structure of plural dimensions, as illustrated separately in FIG. 2B and the like, the data stored in the column of the "operation data" may be a file name that represents a region of the storage device in which "operation data" is stored.

In the column of "abnormality type", a value indicating that "operation data" in the relevant row is "normal" or "abnormal", or a name of abnormality identification which identifies the "abnormality" in the case of the "abnormality" and the like are stored.

Among the vehicle operation history data having the above configuration, data other than "data ID" and "abnormality type" are data included in the data transmitted from the in-vehicle terminal device 31 of the vehicle 30. On the other hand, the "data ID" is assigned when the operation data reception unit 151 receives the operation data transmitted from the in-vehicle terminal device 31 and accumulates the received operation data as vehicle operation history data in the vehicle operation history DB 18.

Further, the column of "abnormality type" is blank when the vehicle operation history data is first accumulated in the vehicle operation history DB 18. Further, thereafter, if there is no repair or adjustment of the vehicle 30 at a repair shop or the like within a predetermined period (for example, three months), value of "normality" is filled in the column of "abnormality type" indicates. On the contrary, thereafter, when any repair or adjustment is performed on the vehicle 30 at a repair shop or the like, and the abnormality type can be clarified, the name of the clarified abnormality type is filled in the column of "abnormality type". However, when the abnormality type cannot be clarified, the value of "abnormality" is simply filled in the column of "abnormality type". Incidentally, filling of the value to "abnormality type" is performed by the maintenance person terminal IF section 16 on the basis of the data that is input by the maintenance person of the vehicle 30 via the maintenance person terminal 22.

Subsequently, as illustrated in FIG. 2B, the operation data is configured to include, for example, data of items such as "data acquisition time", "accelerator opening degree", and "engine rotational speed". Here, the time interval of time advance in the "data acquisition time" column is determined by the "sampling frequency" of the vehicle operation history data. Further, the names of the items such as "data acquisition time" and "accelerator opening degree" are determined by the data of the "sensor item" column of the vehicle operation history data. Therefore, the names of the items are not limited to "data acquisition time", "accelerator opening degree", and the like, but may include sensor names or output signal names of all sensors mounted on the vehicle 30 such as "camera image" and "laser radar distance".

FIG. 3 is a diagram illustrating an example of the configuration of the vehicle maintenance history data stored in the vehicle maintenance history DB 19. As illustrated in FIG. 3, the vehicle maintenance history data includes "maintenance date and time", "maintenance base", "maintenance staff", "vehicle ID", "cumulative maintenance cost", "maintenance component", "maintenance content", "maintenance cost" and the like.

Here, in the respective columns of "maintenance date and time", "maintenance base", and "maintenance staff", the date and time when the maintenance (repair, adjustment, or the like) of the vehicle 30 specified by "vehicle ID" of the column is performed, the name of the repair shop, the name of the maintenance staff, and the like are stored. Further, in the column of "vehicle ID", identification information for uniquely identifying the vehicle 30 subject to maintenance is stored, and in the column of "cumulative maintenance cost", the cumulative amount of the maintenance cost after shipment of the vehicle 30 from the factory is stored. In the columns of "maintenance component", "maintenance content", and "maintenance cost", the component name subjected to maintenance in the maintenance carried out at the "maintenance date and time" of the relevant row, information representing the contents of the maintenance work, and the cost required for maintenance thereof are stored, respectively.

Each time maintenance of the vehicle 30 is performed, the vehicle maintenance history data is created by manipulating the maintenance person terminal 22 by a maintenance staff or the like who performed the maintenance work of the vehicle 30, and the vehicle maintenance history data is stored in the vehicle maintenance history DB 19 via the maintenance person terminal IF section 16. However, the column of "cumulative maintenance cost" does not require manipulation of the maintenance staff and is automatically added by process of the maintenance person terminal IF section 16.

Figure 4:
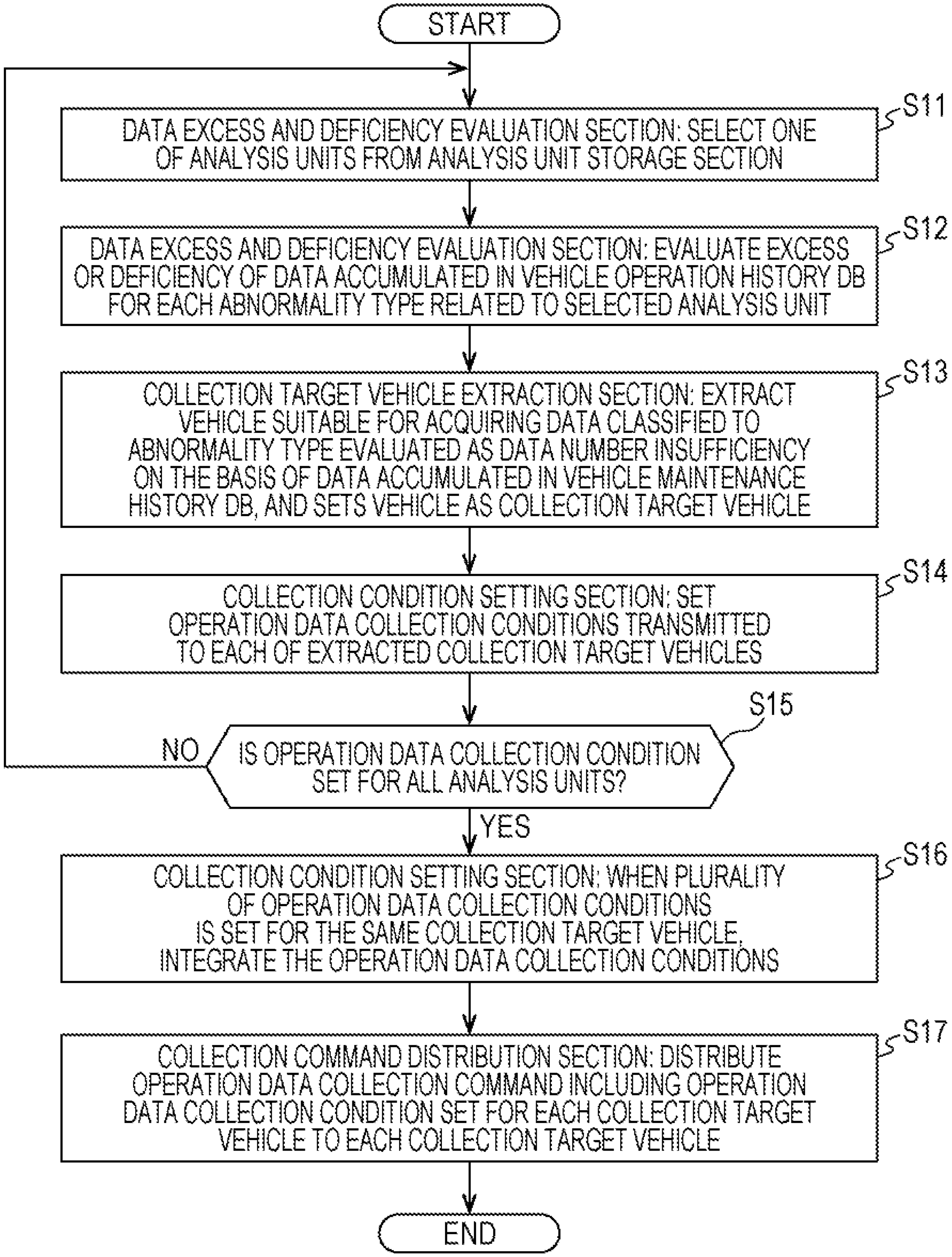
FIG. 4 is a diagram illustrating an example of a flow of overall processes in the vehicle operation data collection apparatus.

FIG. 4 is a diagram illustrating an example of a flow of entire processes in the vehicle operation data collection apparatus 10. By executing this process, the vehicle operation data collection apparatus 10 can efficiently collect the vehicle operation history data of the kind that is insufficient when the vehicle operation history data accumulated in the vehicle operation history DB 18 is used for abnormality detection of the vehicle 30 or classification of the detected abnormality.

Further, hereinafter, the process illustrated in FIG. 4 is executed by the data excess and deficiency evaluation section 11, the collection target vehicle extraction section 12, the collection condition setting section 13, the collection command distribution section 152, and the like of the vehicle operation data collection apparatus 10. Further, this process is executed at a predetermined time period (for example, once a day) or when receiving an execution instruction that is input from the evaluator terminal 21.

As illustrated in FIG. 4, the data excess and deficiency evaluation section 11 of the vehicle operation data collection apparatus 10 first selects one of the analysis units from the analysis unit storage section 17 (step S11). Here, the analysis unit means a combination (set) of data such as a vehicle type, a component configuration, a sensor item, and a sampling frequency, which are required to be specified at the time of individually analyzing abnormality of the vehicle 30. For example, when analyzing the abnormality of the engine of the vehicle type A, it is necessary to analyze a relation between the opening degree sensor of the accelerator and the rotational speed of the engine. In the data of the analysis unit in such a case, for example, the vehicle type is the vehicle type A, the component configuration is the accelerator and the engine, the sensor item is the accelerator opening degree and the rotational speed of the engine, and the sampling frequency is a value of a frequency such as 1 Hz or 2 Hz.

Further, the evaluator who evaluates the abnormality of the vehicle 30 can freely set the analysis unit by manipulating the evaluator terminal 21. Further, the analysis unit set by the evaluator is written on the analysis unit storage section 17 via the analysis unit setting section 141 of the evaluator terminal IF section 14. Here, it is assumed that one or a plurality of analysis units set by the evaluator are stored in the analysis unit storage section 17 in advance.

Next, the data excess and deficiency evaluation section 11 evaluates the excess or deficiency of the vehicle operation history data accumulated in the vehicle operation history DB 18 for each abnormality type related to the selected analysis unit (step S12). That is, the data excess and deficiency evaluation section 11 extracts the vehicle operation history data corresponding to the selected analysis unit from the vehicle operation history DB 18. Further, the extracted vehicle operation history data is classified by a plurality of abnormality types, for example, using a machine learning method, and it is evaluated whether or not the vehicle operation history data accumulated for each abnormality type reaches the accuracy that is sufficient for determining the abnormality type. As it will be described later, this evaluation is processed as a classification problem of machine learning, and the vehicle operation history data classified by the abnormality type in which an accuracy (correct answer rate) higher than a predetermined value is not obtained is determined that the number of data is insufficient.

Here, the abnormality type refers to data expressed by two values (for example, "normal" or "abnormal" data) in the abnormality detection process, and refers to data (for example, an abnormality type name) expressed by a multi-valued value of the number of types of assumed abnormalities in the abnormality classification process. For example, in the abnormality classification process, when three kinds of abnormality "abnormality A", "abnormality B", and "abnormality C" are assumed for a certain component, the abnormality type is expressed by three values of "abnormality A", "abnormality B", and "abnormal C".

Next, the collection target vehicle extraction section 12 extracts the vehicle 30 suitable for acquiring the vehicle operation history data classified by the abnormality type evaluated as data number insufficiency in step S12, on the basis of the vehicle maintenance history data accumulated in the vehicle maintenance history DB 19, and sets the vehicle 30 as a collection target vehicle (step S13).

For example, in the abnormality detection process, when the normal vehicle operation history data is evaluated as insufficiency, a vehicle 30 in which the components corresponding to the component configuration of the analysis unit are immediately after maintenance or a vehicle 30 in which the cumulative maintenance cost is high is extracted as the collection target vehicle from the vehicle maintenance history DB 19. On the contrary, when abnormal vehicle operation history data is evaluated as insufficiency, a vehicle 30 in which components corresponding to the component configuration of the analysis unit are not maintained for a long period of time or a vehicle 30 with a low cumulative maintenance cost are extracted as a collection target vehicle from the vehicle maintenance history DB 19. Such a specification of extraction is based on ideas in which the maintenance of the vehicle 30 with the high cumulative maintenance cost is sufficiently performed from the usual time, and the maintenance of the vehicle 30 with the high cumulative maintenance cost is not sufficiently performed from the usual time.

Further, even when the vehicle operation history data for each abnormality type classified by the abnormality classification process is evaluated as insufficiency, the vehicle 30 in which the components corresponding to the component configuration of the analysis unit are not maintained for a long period of time or the vehicle 30 with a low cumulative maintenance cost is extracted as the collection target vehicle from the vehicle maintenance history DB 19.

Next, the collection condition setting section 13 sets operation data collection conditions which are transmitted to each of the extracted collection target vehicles (step S14). Here, the operation data collection condition refers to information which specifies "vehicle type", "component configuration", "sensor item", and "sampling frequency" in each abnormality type evaluated as data number insufficiency in step S12. For example, the operation data collection condition is information such as "acquiring the rotational speed of the engine and the accelerator opening degree of the vehicle type A at a sampling frequency of 1 Hz".

Next, the collection condition setting section 13 determines whether or not the operation data collection condition is set for all the analysis units stored in the analysis unit storage section 17 (step S15). When the operation data collection condition is not set for all the analysis units (No in step S15), the process returns to step S11, and the processes after step S11 are repeatedly executed.

On the other hand, when the operation data collection condition is set for ail the analysis units (Yes in step S15), if a plurality of operation data collection conditions is set for the same collection target vehicle, the collection condition setting section 13 integrates the operation data collection conditions (step S16). For example, when the collection of rotational speed of the engine is set for the same collection target vehicle in a certain analysis unit and the collection of the wheel speed is set in another analysis unit, the operation data collection condition can be gathered to the conditions for collecting both the rotational number of the engine and the wheel speed. Further, for example, when the collection of the wheel speed at 1 Hz cycle is set for the same collection target vehicle in a certain analysis unit and the collection of the wheel speed at 2 Hz cycle is set in another analysis unit, it is possible to gather these operation data collection conditions to the collection of the wheel speed at the cycle of 2 Hz.

Next, the collection command distribution section 152 distributes the operation data collection command including the operation data collection condition set for each collection target vehicle to each collection target vehicle (step S17). Further, the operation data collection condition distributed to each collection target vehicle is displayed on the evaluator terminal 21 by the collection condition display section 142 in response to the request of the evaluator.

Next, the details of the process of the data excess and deficiency evaluation section 11 in the step S12 will be described. As illustrated in FIG. 1, the data excess and deficiency evaluation section 11 includes an evaluation data generation section 111, a classification learning section 112, and a learning result evaluation section 113.

The evaluation data generation section 111 generates data for performing the learning evaluation by the classification learning section 112. That is, the evaluation data generation section 111 executes processes of extraction of sensor items, determination of sampling frequency, and data loading for each analysis unit. Further, the analysis unit referred to here is information in which a sensor item or sampling frequency for each process of analysis, such as abnormality detection and abnormality classification, is associated with a vehicle type and a component to be analyzed such as "abnormality detection of vehicle type A", and is stored in the analysis unit storage section 17 in advance.

In the process of extracting the sensor item in the evaluation data generation section 111, the sensor item to be analyzed is selected, and in the process of selecting the sensor item, one or more sensor items are selected from the sensor item list predetermined for each component. Also, in the process of determining the sampling frequency, the sampling frequency at the time of analysis is selected from the frequency predetermined for each component in advance. These selections are performed by the evaluator who analyzes the abnormality of the vehicle 30 via the evaluator terminal 21 and the analysis unit setting section 141 of the evaluator terminal IF section 14.

Further, in the data loading process, the evaluation data generation section 111 selects one of the analysis units stored in the analysis unit storage section 17, and loads the vehicle operation history data necessary for analyzing the abnormality related to the selected analysis unit from the vehicle operation history DB 18. That is, from the vehicle operation history DB 18, among the vehicle operation history data corresponding to "vehicle type" and "component configuration" of the analysis target, data of predetermined "sensor item" and "sampling frequency" can be extracted, and the vehicle operation history data having the correct answer value of "abnormality type" is read. Here, the correct answer value of the "abnormality type" refers to a value for each of normality, abnormality or abnormality type name that is set in the column of "abnormality type" of the vehicle operation history data (see FIG. 2A) by the maintenance person via the maintenance person terminal 22.

For example, when the sensor item determined by the analysis unit in the case of the abnormality detection of the engine of the vehicle type A is the accelerator opening degree and the rotational speed of the engine, and the sampling frequency is 2 Hz, "vehicle type" is a vehicle type A, the engine and the accelerator are included in the "component configuration", the accelerator opening degree and the rotational speed of the engine are included in "sensor item information", and the vehicle operation history data having the "sampling frequency" of 2 Hz or more is loaded. Further, at this time, the vehicle operation history data in which the "abnormality type" is blank is not loaded. Also, when the analysis process is an abnormal classification, the vehicle operation history data in which "abnormality type" is "normal" is also not loaded.

In this way, the evaluation data generation section 111 selects one or more sensor items and a set of one or more sampling frequencies for each of one or more analysis items, and extracts and loads the vehicle operation history data corresponding to the combinations from the vehicle operation history DB 18.

The classification learning section 112 calculates the accuracy of classification in the abnormality detection and the abnormality classification for each of the vehicle operation history data of all the combinations loaded by the evaluation data generation section 111. In the present embodiment, an example of accuracy calculation using the machine learning will be described below.

Abnormality detection of operation data can be handled as classification problem of two classes of normality and abnormality in the technique of machine learning, and the abnormality type number of the abnormality classification can be handled as classification problem of the class number. Therefore, in this case, it is considered to perform the abnormality detection and the abnormality classification, using a learning machine generally called "supervised learning classifier" such as support vector machine (hereinafter referred to as SVM).

In this case, the vehicle operation history data extracted and loaded for each analysis item by the evaluation data generation section 111 is learned by the SVM, and the classes of normality/abnormality or abnormality type for each vehicle operation history data are classified. Thereafter, the class classified in this way is compared with the actual class, and the accuracy of classification is obtained on the basis of the result thereof.

Further, the actual class mentioned here is a value in the column of "abnormality type" of the vehicle operation history data and information actually obtained as a result of maintenance. Also, the accuracy of classification refers to the ratio at which the class obtained by SVM (classifier) matches the actual class, and is often also called correct answer rate.

Further, a method called cross validation is used for the accuracy evaluation of the classification using a classifier. As a method of cross validation, for example, there is a k-fold method. In the k-fold method, when dividing the data into k groups and classifying the class information of the i-th group, information of the group other than the i-th group is learned without learning data of the i-th group, and the data of the i-th group is classified. According to the cross validation, it is possible to evaluate the accuracy for data that has not been learned.

Further, in case of the abnormality detection, it is also possible to use a classification method based on unsupervised learning. In this case, only the operation data of the normal class is learned by, for example, a mixed normal distribution. After that, the likelihood of unlearned data is calculated. When the likelihood is equal to or larger than a threshold value, it is classified into a normal class, and when the likelihood is lower than the threshold, it is classified into an abnormal class. Even when using the unsupervised learning method, accuracy evaluation can be performed using the cross validation.

As described above, the classification learning section 112 classifies the vehicle operation history data loaded for each analysis unit into two classes of normality/abnormality or classes of a plurality of abnormality types, and obtains the accuracy of the classification of each class.

The learning result evaluation section 113 performs the excess or deficiency determination of the vehicle operation history data based on the abnormality detection and the accuracy of the abnormality classification obtained by the learning section 112. That is, the learning result evaluation section 113 determines whether or not a predetermined condition is satisfied for each of the combination of one or more of the sensor items and the sampling frequencies for each analysis unit. Further, if the predetermined condition is satisfied, it is determined that a sufficient amount of the vehicle operation history data of the combination is accumulated. Further, if the predetermined condition is not satisfied, it is determined that the vehicle operation history data of the combination is insufficient.

Here, the predetermined condition is, for example, a condition as to whether or not the number of data of each classified class is equal to or greater than a predetermined value, or a condition as to whether or not the accuracy of classification in each class is equal to or greater than a predetermined threshold. For example, when the number of data of each class is smaller than the threshold value, it is determined that the number of data itself is insufficient. When the accuracy of the class classified in the analysis unit is equal to or smaller than the threshold value, it is determined that the vehicle operation history data of the class with accuracy equal to or less than the threshold is insufficient.

FIGS. 5A and 5B are diagrams illustrating an example of the learning result obtained by the classification learning section 112 (see FIG. 1) in a table format, FIG. 5A illustrates an example of a learning result in the case of the abnormality detection, and FIG. 5B is an example of the learning result in the case of the abnormality classification. Such a learning result is displayed on the evaluator terminal 21 via the evaluator terminal IF section 14 in accordance with the request of the evaluator.

As illustrated in FIGS. 5A and 5B, the table of the learning result obtained by the classification learning section 112 includes the columns of "vehicle type, components", "process", "sensor item", "sampling frequency", "data number", "correct answer rate" and the like. In the case of the abnormality detection process (FIG. 5A), the column of "correct answer rate" includes two columns of "normality" and "abnormality", and in the case of the abnormality classification process (FIG. 5B), the column of "correct answer rate" includes the same number of columns as the number of abnormality types (number of classes) obtained in the abnormality classification process.

Further, the correct answer rate mentioned here is an example of an index representing the accuracy of classification using the machine learning, and is given by the value acquired by dividing the number, in which the class classified by the classification learning section 112 matches the class obtained by actual maintenance, by the data number of the analysis target. Further, the correct answer rate is obtained for each class number of the classified classes.

In this way, the learning result evaluation section 113 can obtain the accuracy of all class classifications for each analysis unit in which the vehicle type, components, and analysis process of the analysis target are all the same.

Here, when the number of data of the normal or abnormal class is greater than the predetermined number of data and the correct answer rate in each class is higher than the predetermined threshold, the learning result evaluation section 113 determines that the operation data of the class is satisfied. Further, the operation data belonging to the normal or abnormal class is excluded from the operation data to be collected.

On the other hand, when the number of data in the normal or abnormal class is smaller than the predetermined number of data and the correct answer rate in each class is lower than the predetermined threshold, the learning result evaluation section 113 determines that the operation data of the class is insufficient. Further, the operation data belonging to the normal or abnormal class is set as operation data to be collected.

When receiving information on the analysis unit in which the operation data from the learning result evaluation section 113 is determined to be insufficient, the collection target vehicle extraction section 12 (see FIG. 1) extracts the vehicle maintenance history data having the corresponding vehicle type or the component configuration from the vehicle maintenance history DB 19. Furthermore, as described in step S13 of FIG. 4, when the collection target vehicle is the normal class, vehicles immediately after the maintenance of the components of the analysis unit or vehicles with the cumulative maintenance cost higher than the predetermined threshold are extracted as vehicles to be collected. Conversely, when the collection target is an abnormal class, vehicles in which the components of the analysis unit are not maintained for a certain period of time or vehicles with the cumulative maintenance cost lower than the predetermined threshold are extracted as vehicles to be collected.

As described in steps S14 and S16 of FIG. 4 extracted for each analysis unit, the collection condition setting section 13 sets the operation data collection conditions for the collection target vehicle extracted for each analysis unit, and also integrates the operation data collection conditions when a plurality of operation data collection conditions is set for the same collection target vehicle. Further, as described in step S17 of FIG. 4, the collection command distribution section 152 distributes the operation data collection command including the operation data collection condition set for each collection target vehicle to each collection target vehicle.

FIG. 6 is a diagram illustrating an example of the operation data collection condition display screen 50 displayed on the evaluator terminal 21 by the collection condition display section 142. As illustrated in FIG. 6, a vehicle type selection section 51, a component selection section 52, a collection situation and accuracy checking section 53, a collection command checking section 54, and the like are displayed on the operation data collection condition display screen 50.

When checking the operation data collection condition in the operation data collection condition display screen 50, the analyzer can select the vehicle type and components to be checked, by the vehicle type selection section 51 and the component selection section 52, for example, from the pull-down displayed vehicle type or components.

In the collection state and accuracy checking section 53, accuracy (correct answer rate) and excess and deficiency determination result for each analysis unit (sensor item, sampling frequency) for the vehicle type and components selected via the vehicle type selection section 51 and the component selection section 52 are displayed. Accordingly, the analyzer can check the analysis process, the sensor item, the sampling frequency, the number of data, the correct answer rate of each class, and the result of excess and deficiency determination for each analysis unit, by the display of the collection state and accuracy checking section 53.

In the collection command checking section 54, the collection target vehicle, the sensor item and the sampling frequency are displayed. Here, as the collection target vehicle, the vehicle ID for individually specifying the vehicle 30 as a distribution target of the operation data collection command is displayed, and the total number of vehicles is displayed. Further, the sensor item and the sampling frequency are information directly forming the operation data collection command, which corresponds to an instruction "acquire the accelerator opening degree, the rotational speed of the engine, and the wheel speed at a sampling frequency of 2 Hz".

The analyzer can check the distributed operation data collection command which is transmitted to the collection target vehicle, by the display of the collection command checking section 54. Further, the analyzer can grasp on what type of vehicle 30 the operation data collection command is distributed, by the operation data collection condition display screen 50.

As described above, in the embodiment of the present invention, the vehicle operation data collection apparatus 10 evaluates what kind of the vehicle operation history data of the abnormality type is insufficient for each analysis unit at the time of analyzing the vehicle abnormality, in the vehicle operation history data accumulated in the vehicle operation history DB 18. Next, the vehicle operation data collection apparatus 10 extracts the vehicle 30 determined that it is possible to efficiently acquire the vehicle operation history data of the abnormality type related to the analysis unit in which the vehicle operation history data is determined to be insufficient, from the vehicle maintenance history DB 19. Further, the vehicle operation data collection apparatus 10 distributes an operation data collection command for acquiring the vehicle operation history data of the abnormality type evaluated to be insufficient to the extracted vehicle 30, and acquires the vehicle operation history data from the vehicle 30, as a response thereof.

Therefore, according to the embodiment, the vehicle operation data collection apparatus 10 can efficiently collect the vehicle operation history data of the abnormality type evaluated to be insufficient. In other words, it is possible to efficiently collect the vehicle operation data at the time of occurrence of the abnormality even for an abnormality having a low occurrence frequency.

Furthermore, when the vehicle operation history data of the abnormality type evaluated to be insufficient is efficiently collected and the abnormality detection or the abnormality classification using the machine learning can be set to a predetermined accuracy (correct answer rate) or more, it is possible to reduce the work load of the abnormality detection and the abnormality classification of the maintenance person. As a result, in repair shops and the like of the vehicle 30, it is possible to expect effects such as reduction in man-hours for maintenance and cost reduction.

The present invention is not limited to the above-described embodiments and modified examples, and various modified examples are included. For example, the above-described embodiments and modified examples have been described in detail in order to explain the present invention in an easy-to-understand manner, and are not necessarily limited to those having all the configurations described. In addition, some of the configurations of certain embodiments and modified examples can be replaced with configurations of other embodiments and modified examples, and it is also possible to add the configuration of other embodiments and modified examples to the configuration of certain embodiments and modified examples. In addition, it is also possible to add, delete, or replace the configurations included in the other embodiments and modified examples with respect to some of the configurations of the embodiments and the modified examples.

What is claimed is:

1. A vehicle operation data collection apparatus comprising:

a memory configured to store operation data of a plurality of vehicles acquired from the plurality of vehicles; and a processor programmed to evaluate excess or deficiency of operation data of the plurality of vehicles stored in the memory for each of abnormality types, on the basis of accuracy information of classification obtained when classifying the abnormality types occurring in the plurality of vehicles by machine learning, using operation data of the plurality of vehicles stored in the memory;

extract, from the plurality of vehicles, a vehicle suitable for acquiring data of an abnormality type evaluated as data deficiency from a database accumulating maintenance history information of the plurality of vehicles as a collection target vehicle; and distribute a collection command instructing collection of operation data to the extracted collection target vehicle; and receive the operation data from the extracted collection target vehicle.

2. A vehicle operation data collection system comprising:

a memory configured to store operation data of a plurality of vehicles acquired from the plurality of vehicles; and a vehicle operation data collection apparatus which has a processor programmed to evaluate excess and deficiency of the operation data of the plurality of vehicles accumulated in the memory for each of abnormality types, on the basis of accuracy information of classification obtained when classifying the abnormality types occurring in the plurality of vehicles by machine learning, using the operation data of the plurality of vehicles accumulated in the memory, extract, from the plurality of vehicles, a vehicle suitable for acquiring data of an abnormality type evaluated as data deficiency from a database accumulating maintenance history information of the plurality of vehicles as a collection target vehicle, distribute an operation data collection command instructing collection of operation data to the extracted collection target vehicle, and receive the operation data from the extracted collection target vehicle; and the plurality of vehicles which has a communication unit which communicates with the vehicle operation data collection apparatus, one or more sensors attached to one or more components constituting the plurality of vehicles, and an in-vehicle terminal which acquires sensor data from the sensor specified by the operation data collection command and collects the acquired sensor data as operation data of the plurality of vehicles when receiving the operation data collection command.

3. A vehicle operation data collection method which causes a computer connected communicably to a plurality of vehicles to execute the steps of:

accumulating operation data of a plurality of vehicles acquired from the plurality of vehicles in a storage device;

evaluating excess or deficiency of operation data of the plurality of vehicles accumulated in the storage device for each of abnormality types, on the basis of accuracy information of classification obtained when classifying the abnormality types occurring in the plurality of vehicles by machine learning, using operation data of the plurality of vehicles accumulated in the storage device;

extracting, from the plurality of vehicles, a vehicle suitable for acquiring data of an abnormality type evaluated as data deficiency in the evaluating excess or deficiency of operation data of the plurality of vehicles from a database accumulating maintenance history information of the plurality of vehicles, as a collection target vehicle; and distributing a collection command instructing collection of operation data to the extracted collection target vehicle; and receiving the operation data from the extracted collection target vehicle.

* * * * *